Figure 1:
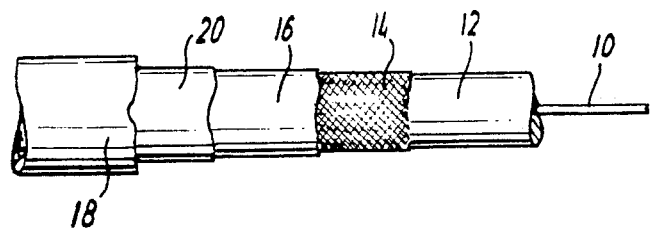

United States Patent [19]

McDonald

[11] Patent Number: 4,514,036
[45] Date of Patent: Apr. 30, 1985

[54] CABLE HAVING A LAMINATED PLASTIC INSULATING SHEATH

[75] Inventor: Neil McDonald, Manchester, England

[73] Assignee: Raydex International Limited, Lancashire, England

[21] Appl. No.: 518,328

[22] Filed: Aug. 1, 1983

Related U.S. Application Data

[63] Continuation of Ser. No. 309,750, Oct. 8, 1981.

[30] Foreign Application Priority Data

Oct. 10, 1980 [GB] United Kingdom ............... 8032787

[51] Int. Cl.³ .................. B32B 27/00; G02B 5/16; H01B 7/00
[52] U.S. Cl. .................. 350/96.23; 174/107; 174/120 SR; 428/383; 428/389
[58] Field of Search .............. 428/379, 375, 383, 389, 428/515, 516, 520, 522; 174/120 SR, 110 PM, 110 SR, 120 R, 110 V, 110 F, 107, 28; 350/96.23

[56] References Cited

U.S. PATENT DOCUMENTS

| | | | |
|---|---|---|---|
| 2,707,205 | 4/1955 | Abbott et al. | 174/120 SR |
| 3,482,033 | 12/1969 | Kenney et al. | 174/107 |
| 3,687,748 | 8/1972 | Clock et al. | 174/107 X |
| 3,798,115 | 3/1974 | Hofmann | 428/516 X |
| 3,852,518 | 12/1974 | Wargotz et al. | 174/120 SR |
| 4,024,316 | 5/1977 | Loris | 428/520 X |
| 4,101,050 | 7/1978 | Buckler et al. | 428/516 X |
| 4,123,576 | 10/1978 | Kobayashi et al. | 428/36 X |
| 4,292,463 | 9/1981 | Bow et al. | 428/349 X |

*Primary Examiner*—Lorraine T. Kendell
*Attorney, Agent, or Firm*—Alan H. Levine

[57] ABSTRACT

Considerable problems are experienced with cables when inserting them in conduit. Only a limited length can be inserted in the conduit so that there must be frequent joints in the cable and the outer sheath is often damaged. The present invention provides a laminate which is particularly applicable as the outer sheath on a cable and which includes a first inner layer of plastics and an outer layer of different harder plastics and incompatible with the first layer and bonded to the inner layer by a bonding layer which is a mixture of the plastics of the two layers. The laminate has applications in addition to cable sheaths.

7 Claims, 2 Drawing Figures

CABLE HAVING A LAMINATED PLASTIC INSULATING SHEATH

This application is a continuation of application Ser. No. 309,750, filed Oct. 8, 1981.

This invention relates to lamination of plastics particularly but not exclusively in the lamination of plastics sheaths on information or power carrying cables.

Generally sheaths on cables consist of a single substantially homogeneous material. For many applications major benefits may be achieved by using layers of dissimilar materials to create properties which are not achievable by the use of a single material. Benefits which may be desired could for example be a combination of the following
  (i) mechanical strength
  (ii) abrasion resistance
  (iii) chemical resistance
  (iv) surface frictional resistance
  (v) flame retardence
  (vi) flexibility
  (vii) cost
  (viii) aesthetics When different materials are processed together, a varying degree of natural bonding occurs, ranging from good to complete lack of adhesion, dependent mainly on the characteristics of the individual materials used. Generally, superior overall characteristics are achieved in laminated sheaths when the individual layers are bonded together and this is particularly relevant when thin layers are used.

The present invention has been made from a consideration of this problem. This invention covers a technique of creating a bond between many dissimilar plastic materials. Even when adhesion and partial adhesion occurs naturally, the invention can be used in many instances to improve the quality of the bond.

According to the invention there is provided a plastics laminate comprising a first plastics layer, a second plastics layer different to the first and incompatible with the first layer; said second plastics layer being bonded to the first layer by means of a layer of bonding materials, and so on for multiple layers.

The term plastics as used herein includes natural and synthetic rubbers as well as polymers and other materials which are normally designated as plastics.

It is sometimes possible to use as the bonding layer an adhesive, for example a known commercially available adhesive, although this is not normally recommended because of the entrapment of solvents from the adhesive between the plastics layers. It is preferred to use as a bonding material a mixture of plastics of the first and second layers, and so on for multiple layers. The amount of the two plastics materials in the mixture bonding the two layers together are preferably equal by volume but good results can be obtained with unequal amounts such as within the range 65:35 to 35:65 by volume preferably within the range 60:40 to 40:60 by volume. The bonding layer may also contain additives to meet specific technical requirements. The laminate is preferably formed by sucessive processing, of the first, bonding and second layers and so on for multiple layers. Each layer is preferably deposited on the preceding layer while in a plastics state and advantageously while the preceding layer is also in a plastic state. In the case of a cable sheath where the layers may be extruded they may be formed in a single extrusion operation in which the second and subsequent layers are extruded onto the preceding layer while in the plastic state or in a multiple operation where the layers are extruded onto preceding layers that have hardened. Common forms of power and information carrying cables include a combination of conducting and non-conductive materials surrounded by an external sheath of non-conductive plastics.

For underground applications, polyvinyl chloride is generally used as the sheath for power installations and polyethylene for communication cables. Polyvinyl chloride is not recommended for communication cables because moisture can penetrate polyvinyl chloride at a far higher rate than with polyethylene. Also polyvinyl chloride is often susceptible to pinholes being created during processing which allows moisture to penetrate. In the case of power cables, heat dissipation from the conductors overcomes this problem, but in communication cables the power dissipation is minimal and problems can arise.

Both types of sheaths are generally susceptible to damage during installation for example when being pulled into ducts or from backfilling materials when directly buried in the ground. Damage to the sheath may expose the inner part of the cable to the environment.

To deal with these problems it has been proposed to provide armour metal in the cable, to increase the thickness of the outer sheath or to use a very hard abrasive resistant material for the sheath. But none of these proposals really deals effectively with the above-mentioned disadvantages, and moreover they all result in a cable which is very much less flexible. In addition the use of metal armour and thicker sheaths increases the size of the cable so that it is more difficult to lead it through ducts and other confined spaces.

By the invention, it is possible to provide a cable with a sheath in the form of a plastics laminate having an outer layer with the desired external characteristics such as good impact and abrasive resistance. The outer layer can be relatively thin compared to a softer inner layer so that flexibility is preserved. The hard and soft layers are firmly bonded together, this being important since if they are not so bonded the outer layer could be stripped from the under layer. Thus the invention provides the benefit of the flexible inner layer with the strength of the outer layer.

A further major advantage is that if a material is selected for the outer layer which has low frictional resistance characteristics, a cable can be produced which can be pulled into ducts with far less pulling force, and hence less risk of damage. Also longer lengths of cables may be pulled in thus reducing the number of joints necessary in the system. Low frictional resistance materials are generally extremely rigid, and by simply applying a single sheath of the material, the major advantages are negated due to reduction in the flexibility of the finished cable.

Any suitable plastics material may be used for the invention, but a particularly useful product is obtained with low density polyethylene sheathed cables, when the polyethylene is covered with a hard layer of polypropylene. A suitable configuration is achieved when the ratio of the radial thickness of the polyethylene, the bonding layer, and the polypropylene is in the range 3:0.4:1 to 1:0.4:1 and preferably in the order of 2:0.4:1.

The polypropylene layer improves abrasion resistance, chemical resistance and provides a high slip surface.

Figure 2:
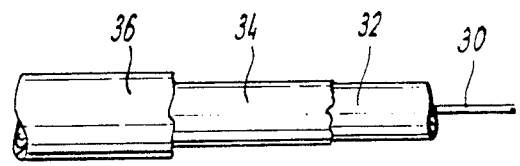

The following examples further illustrate the invention. The examples make reference to specific embodiment of the invention which are described in connection with the accompanying drawings in which:

FIG. 1 is a view in side elevation, partly in section of a communications cable; and FIG. 2 is a view in side elevation, partly in section of a power cable.

EXAMPLE I

Referring to FIG. 1 a communications cable comprises an inner conductor 10 for example of copper surrounded by dielectric 12 which may be cellular and made for example of plastics such as polyethylene. The dielectric is covered by a metal braid 14 which may be of copper. The braid is covered by a laminate according to the invention consisting of a first layer 16 of plastics material such as polyethylene bonded to a second outer and harder layer 18 of plastics material such as polypropylene by a bonding layer 20 which is a mixture of the materials of layers 16 and 18.

In a specific example of the embodiment of FIG. 1 just described layer 16 is of low density polyethylene and is applied over a screen having a diameter of 10.76 mm to a diameter of 13.0 mm. The bonding layer 20 is a 50/50 by volume mixture of low density polyethylene/polypropylene and is applied on layer 16 to a diameter of 13.4 mm. Finally the outer layer 18 of polypropylene is applied on the bonding layer to a diameter of 14.45 mm.

The cable so produced was compared with a prior art cable which did not have the laminate outer sheath of the present invention but a substantially homogenous outer sheath of polyethylene. The overall diameter of the prior art cable was 13 mm. The maximum length of prior art cable that could be pulled through ducting or conduit was found to be about 70 meters. Such a length required at least two men pulling the cable and one pushing.

The cable of the invention, which was of slightly larger size than the prior art cable could be pulled with ease by one man through the same size ducting in lengths in excess of 240 m. The outer surface of the cable of the invention had a very much lower coefficient of friction than the prior art cable. In addition the laminate outer sheath gave the cable improved tensile and compression strength compared to the prior art cable.

The second example concerns polyvinyl chloride insulated cables used in power wiring systems, such as in the home. The cable is susceptible to damage during installation as it is pulled in through conduit or apertures in junction boxes or other fittings, where the edges of the aperture can strip the insulating material off the cable. If a very hard grade of polyvinyl chloride having low frictional resistance properties is selected as the outer layer of the cable and bonded to a softer inner layer of PVC, the possibility of damage is greatly reduced and ease of installation is greatly improved. Often more individual cables may be pulled into a single conduit than at present.

EXAMPLE II

Referring to FIG. 2 a single core power cable comprises a conductor 30 for example of copper. The conductor is sheathed by the laminate of the invention comprising a first layer 32 of plastics such as soft grade polyvinyl chloride, a bonding layer 34 and an outer layer 36 of plastics such as hard grade polyvinyl chloride. The bonding layer consisted of a 50/50 by volume mixture of hard and soft grade polyvinyl chloride.

In a specific example of the above embodiment the conductor diameter is 1.78 mm and is insulated by the laminate of the invention to a diameter of 3.5 mm. The ratio of diameters between the three layers is 2:0.4:1.

The cable so produced is considerably stronger both in tension and compression than prior art cables. In addition it had a surface of relatively low coefficient of friction so that it was easier to pull through conduit than prior art cables.

The examples clearly show the advantages that the use of the invention gives in connection with cables.

Because longer lengths can be pulled through conduit fewer joints are required to connect the lengths together. The savings that result are very great because in cable installations it is the cost of the joints that is one of the major expenses. The ease with which the cable can be pulled through ducting means that severe tensile forces are not applied to the cable, but in any event the cable of the invention can withstand increased tensile stress, because of the increased tensile strength imparted to the cable by the laminate. The increase in both tensile and compression strength given by the invention is of the order of 50%.

The invention is not confined only to use with cables as described in the examples. It can be used in a variety of different applications. For example it can be used as a sheath for a cable comprising optical fibres where the high strength of the laminate gives very good protection to the fibres. The expense of joining optical fibres is even greater than joining power cables or communication cables so that the advantages of being able to pull long lengths through ducting are even greater. In addition the high tensile strength protects the fibres when they are pulled through ducting and moreover less tensile forces are applied because of the low coefficient of friction of the laminate surface.

The laminate may also be used as a lining for ducting. Such application gives a further reduction in the friction developed when cables are pulled through the ducting.

Another application for the laminate of the invention is in connection with containers where there are requirements for the interior to be of a different material to the exterior.

I claim:

1. A cable having conductor means surrounded by an insulating sheath, the exterior of the sheath constituting the exterior of the cable, the sheath consisting essentially of:

a flexible relatively soft inner layer of polyethylene, a relatively hard abrasion-resistant outer layer of polypropylene having low frictional resistance characteristics, the polypropylene being sufficiently thin so as not to substantially limit the flexibility of the cable, said polypropylene forming the outermost layer of the cable, an intermediate layer intimately bonding together the inner and outer layers, the intermediate layer being a homogeneous mixture of said polyethylene and said polypropylene, said intermediate layer and outer layer being formed by extruding them on to the inner layer.

2. A cable as claimed in claim 1, wherein the intermediate layer comprises 50/50 mixture of polyethylene and polypropylene by volume.

3. A cable as claimed in claim 1, wherein the thickness of said first layer, intermediate bonding layer, and outer layer are in the ratio in the range 3.0:0.4:1 to 1.0:0.4:1.

4. A cable as claimed in claim 1, wherein the conductor means comprises a metal conducter.

5. A cable as claimed in claim 1, wherein the conductor means comprises optical fibres.

6. A cable as claimed in claim 1, wherein the conductor means is surrounded by a dielectric layer.

7. A cable as claimed in claim 6, wherein a screen is provided between the dielectric and the sheath.

* * * * *